United States Patent [19]
Kendall

[11] 3,809,223
[45] May 7, 1974

[54] PROTECTED LUMBER PACKAGE AND METHOD OF MAKING SAME

[75] Inventor: Burt C. Kendall, Aptos, Calif.

[73] Assignee: Crown Zellerbach Corporation, San Francisco, Calif.

[22] Filed: Aug. 27, 1971

[21] Appl. No.: 175,455

[52] U.S. Cl............ 206/204, 206/321, 206/819, 206/497, 53/30, 312/31
[51] Int. Cl............................................. B65d 85/46
[58] Field of Search..... 206/65 S, 65 B, 60 R, 46 F, 206/46 PV, 46 LM; 312/31; 229/DIG. 12; 53/30

[56] References Cited
UNITED STATES PATENTS

| | | | |
|---|---|---|---|
| 2,584,241 | 2/1952 | Stewart | 206/60 R |
| 3,529,717 | 9/1970 | McDougal | 206/65 S |
| 2,559,109 | 7/1951 | Bonini | 312/31 |
| 3,119,584 | 1/1964 | Cook et al | 229/48 T |
| 2,156,357 | 5/1939 | Simpson | 312/31 |
| 3,026,209 | 3/1962 | Niblack et al. | 206/46 F |
| 3,063,767 | 11/1962 | Heuer | 206/65 B |
| 3,508,375 | 4/1970 | Myers | 206/65 S |

Primary Examiner—William T. Dixson, Jr.
Attorney, Agent, or Firm—Stanley Bialos; Corwin R. Horton; Thomas R. Lampe

[57] ABSTRACT

Conventionally stacked lumber is protected from weathering by an envelope of moisture impervious plastic sheet film material which is heat-shrinkable. To prevent mold growth and discoloration of the lumber by moisture which would become trapped between the film and the lumber, resulting from entrapped air and the vaporization of moisture inherently present in the lumber, a layer of moisture absorbent material is provided at least over the top of the stack between the plastic envelope and the lumber. Heat shrinking of the film effects a tightly bonded reinforced package.

12 Claims, 4 Drawing Figures

INVENTOR
BURT C. KENDALL

PATENTED MAY 7 1974

INVENTOR
BURT C. KENDALL

BY: Stanley Bialer
Corwin R. Horton
Thomas R. Sampse

ATTORNEYS

PROTECTED LUMBER PACKAGE AND METHOD OF MAKING SAME

This invention relates to the packaging of lumber, and more particularly to protection of the package with a plastic film while preventing mold growth, and discoloration of the lumber by moisture which would become trapped between the film and the lumber.

BACKGROUND OF THE INVENTION

Fresh lumber made at the mills, such as planks, two by fours, plywood and particle board, is customarily stacked outdoors in piles, for storage and subsequent shipment. To protect the lumber against weathering by the elements, it has heretofore been customary in commercial practice to wrap a pile of lumber with a laminated sheet comprising paper and moisture impervious plastic sheet material adhesively bonded together. Such type of package is quite loose, and moisture vapor escaping from the lumber and air in the package can vent through fissures or openings in the wrapping, thus precluding condensation of moisture trapped between the wrapping and the lumber which causes mold growth, and staining or darkening of the lumber. However, packaging in such a manner is not all to be desired in protecting the lumber; and because the wrapping has to be secured by suitable means, such as staples, it is also time consuming, and relatively costly.

If shrinkable moisture-impervious plastic film, such as polyethylene film, is heat-shrunk tightly directly about a stack of lumber, vapor from moisture which evolves upwardly from the lumber, cannot escape because of tight adherence of the shrunk film over the entire package and its moisture impervious character. Consequently, the moisture collects or deposits in beads on the surface of the lumber, which under the action of bacteria forms mold growth which stains the lumber. If moisture impervious film is merely wrapped about the lumber, then the problem arises of billowing of the film under wind effect, which results in tearing of the wrapping.

The U.S. Pat. to Stewart, No. 2,584,241, dated Feb. 5, 1952, discloses a lumber package in which a foraminous sheet, such as tough paper, is covered over the package, and then the package is sprayed with a plastic coating. This coating works through the apertures in the foraminous sheet to adhere the sprayed coating to the lumber. In this method of packaging the spraying is time-consuming because it is much akin to painting a surface; and moreover it is difficult to obtain an even coating. Also, since the bonding of the sprayed coating to the lumber is primarily through the apertures, a tight plastic covering over the entire package is not usually obtainable.

SUMMARY AND OBJECTS

Summarizing the invention hereof, it overcomes the afore-described problems by utilizing shrinkable, substantially moisture-impervious plastic sheet film material which is shrunk tightly over a stack or pile of lumber to form an envelope which protects the lumber against weathering. Interposed between the film and the lumber, at least over the top of the lumber stack, and desirably the ends, or at least partially over the ends and partially over the sides, a layer of moisture absorbent material is provided, such as conventional paper toweling. Moisture from the lumber rises to the top and becomes absorbed by the absorbent layer, which serves as a blotter, thus precluding mold growth and staining of the lumber.

From the preceding, it is seen that the invention has as its objects, among others, the provision of an improved lumber package and method of packaging lumber to protect it against the elements during storage and shipment, which are simple and economical, and which even though a moisture impervious plastic film is tightly secured about a stack of lumber, have means to absorb such moisture, and thus prevent mild growth with consequent staining of the lumber.

Other objects of the invention will become apparent from the following more detailed description and accompanying drawings, in which:

DETAILED DESCRIPTION

Figure 1:
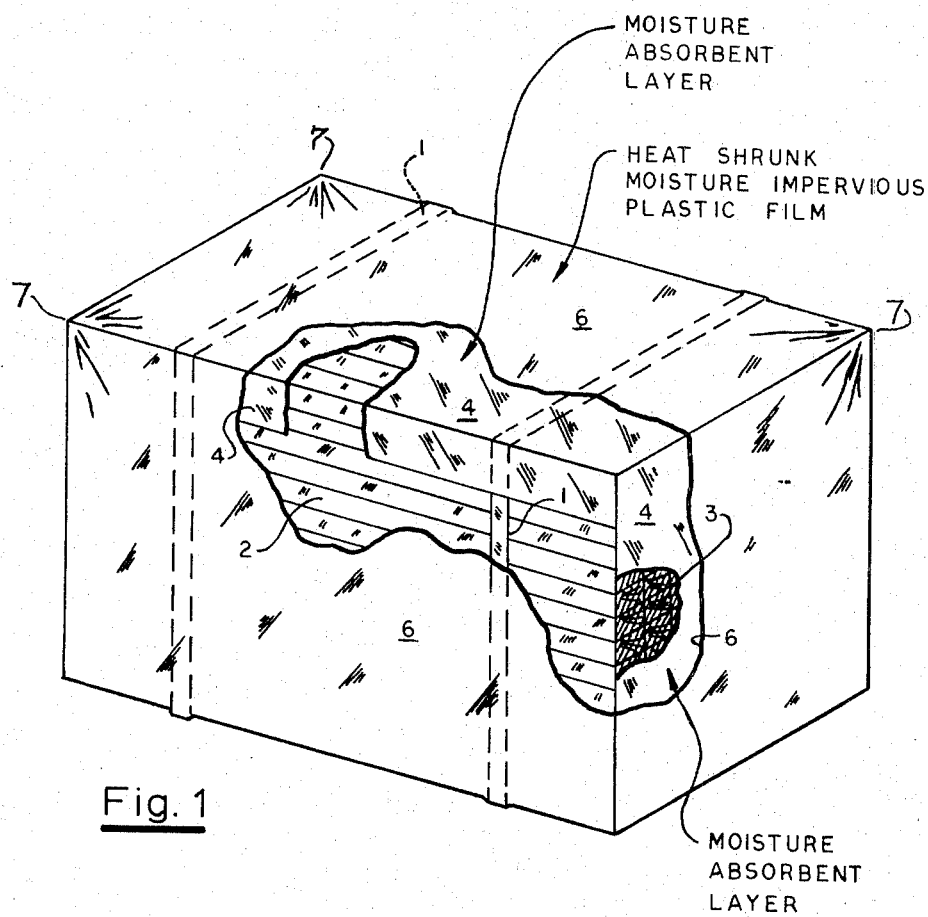
FIG. 1 is an isometric view of a form of package illustrating a stack of two by fours packaged by the invention hereof; portions of the package covering being shown broken away to illustrate the construction.
Figure 2:
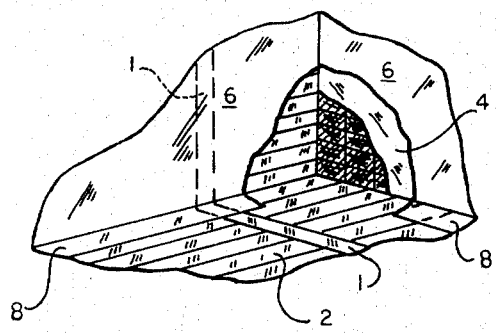
FIG. 2 is a fragmentary bottom view of a corner of the package.

The package hereof has a covering for protecting lumber which is stacked for storage and subsequent shipment in the usual manner after it is produced at the mill. FIG. 1 illustrates a common form of stack of two by fours which are supported on runners (two by fours, not shown) extending crosswise thereof. Usually the stack is of parallelepiped shape bound in compressed state by conventional straps 1. It has opposite sides 2 running the length of the grain of the lumber, and opposite ends 3. A layer 4 of moisture absorbent material is provided at least over the top of the stack, and desirably completely over ends 3 and partially down sides 2. An outer envelope of moisture impervious heat shrinkable plastic film 6 is heat shrunk tightly about the lumber with the moisture absorbent material 4 between the film and the lumber.

Heat shrinkable film 6 is desirably a single sheet of sufficient area, and is initially draped over the stack, completely over the top, and both ends and both sides, with moisture absorbent layer 4 under the film. It is then heat shrunk tightly against the stack. Before the heat shrinking, the sheet is folded to provide gussets at the top corners, as is indicated at 7.

Moisture from entrapped air and inherently present in the lumber cannot condense into droplets as it vaporizes because it is completely absorbed by moisture absorbent layer 4 which serves as a blotter to maintain the package dry and free of moisture which would otherwise cause molding and staining of the lumber. In this connection, the absorbent layer could be applied completely only over the top because moisture vapor rises, and will be absorbed at the top. However, because the grain is exposed at the ends of the lumber, it is desirable to cover completely the ends 3 with moisture absorbent layer 4 to insure against mold formation; and to insure moisture absorption at the top, sides 2 are at least partially covered by the moisture absorbent layer adjacent the top, as shown by the overlap in FIG. 1. Also, ends 3 may be similarly partially covered instead of completely covered by moisture absorbent layer 4.

Film 6 is of such size that when it is shrunk tightly over the lumber, a slight lap 8 is provided over the bottom edges of the stack. In the heat shrinking, the overlapped bottom portions 8 automatically curl up against the bottom of the stack. Any suitable, flexible, heat shrinkable, moisture impervious film material of well-known types may be employed. Shrink films commonly available are low density polyethylene, oriented polypropylene, polyvinyl chloride polyvinyldene chloride and oriented polystryene. Advantageously, the film is of the biaxial shrinkable type so that it will shrink substantially equally in two directions extending transversely with respect to each other.

The preferred film is low density polyethylene of the blown type, and the film found most suitable is one which has at least 40 to 50 percent shrinkage in each direction so as to effect as tight and even gripping of the lumber as possible. The thickness of the film is desirably at least about 4 mils for adequate strength, and preferably between about 5 to 8 mils, although the maximum thickness is not particularly critical as long as the film will shrink and tightly adhere in the package. Films of excessive thickness, such as 10–12 mils, increase cost, and are therefore uneconomical.

Any suitable moisture absorbent material may be employed, desirably flexible cellulosic sheet material, which will serve as a blotter to absorb moisture vapor from the lumber to thereby preclude formation of water droplets which would otherwise deposit onto the wood. Material found most suitable is conventional creped paper toweling commonly employed in washrooms, of about 12 to 14 pounds per ream basis weight.

In shrinking of the film after it has been draped over the lumber, heat is applied all over the entire film in the usual manner for a sufficient time to obtain tight engagement of the film all over the lumber. As previously mentioned, before the heat is applied, the film is folded over at the top corners to from gusset portions 7. Heat shrinking is a function of time and temperature; and the heat application for any given temperature is applied long enough to obtain the tight fit. For the preferred low density polyethylene film, a suitable temperature is about 325° to 400° F. for about 30 to 45 seconds. In this connection, the shrinking of the film tightly about the package can be effected in the usual manner for formation of shrink film packages wherein the package is placed in a tunnel or room heated at the desired temperature, and left there for the requisite time to effect the desired amount of shrinking. This may be done batchwise or in a continuous manner by conveying successive packages through a heated tunnel section.

In the shrinking operation, moisture absorbent layer 4 protects the film during shrinking by preventing wood slivers from puncturing the film; particularly at the corners. After the package has been completely formed with the film in tight engagement, the film cooperates with the aforementioned bands to hold the bundle tightly together.

Figure 3:
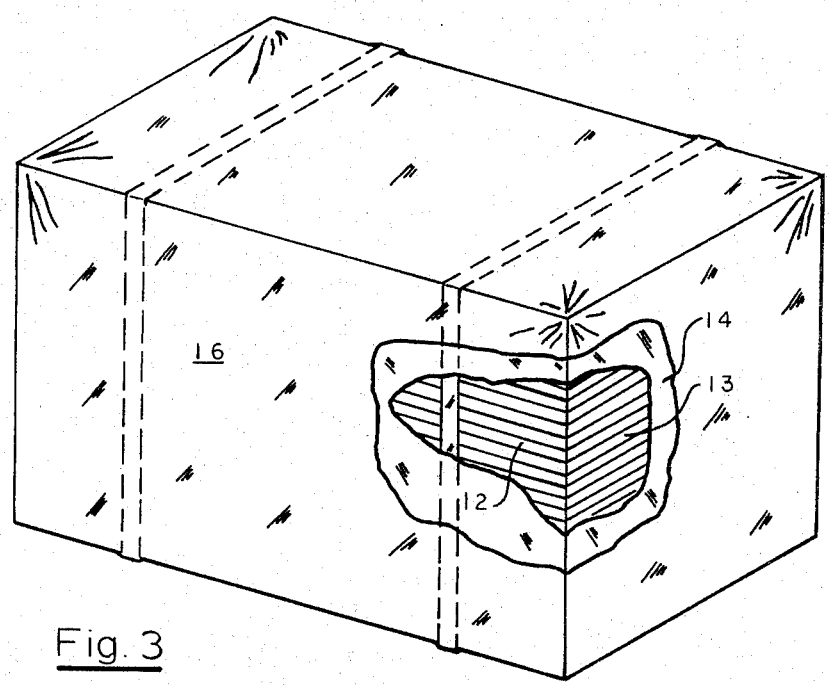
FIG. 3 is a view similar to FIG. 4 illustrating a pile or stack of plywood, and a modified protective cover arrangement which can be employed.
Figure 4:
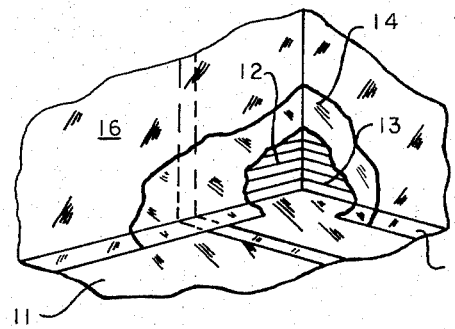
FIG. 4 is a fragmentary bottom corner view of the package of FIG. 3.

In the embodimnt of FIGS. 3 and 4, the package is substantially the same as that described above but the packaging of particle board panels 11 is illustrated. In this modification, moisture absorbent layer 14 completely covers both the opposite sides 12 and the opposite ends 13, as well as the top. As with respect to the previous modification, the bottom of the package is open except for a short overlap 17 of both layer 14 and the film 16 along all the edges or margins of the bottom.

In actual tests, a control package of lumber, stacked and bound, as illustrated in FIG. 1, was formed wherein heat shrinkable low density polyethylene film was heat shrunk as an envelope directly against the lumber and about the entire package except for the bottom. After about three months of exposure to the weather elements, the heat shrunk polyethylene envelope was removed; and it was found that a layer of water droplets was trapped on top. The general appearance of the wood on the sides was of wetness and of yellow discoloration. Mold had also formed; and the ends of the lumber were blackened and stained, even though they had been previously painted.

In comparison, the identical type of package with moisture absorbent paper toweling between the shrunk film and the lumber, as in FIG. 1, was exposed to the weather for the same time and showed no evidence of moisture when the film was removed. The only vapor in the package was on the shaded side. The toweling was in good condition and dry to the touch. The wood was also dry to the touch, and was bright and light in coloring with only slight sun tanning on the sunny side. The painted ends of the wood appeared in excellent condition.

I claim:

1. The method of forming a package of lumber with a covering of substantially moisture-impervious plastic sheet film material to protect the lumber against weathering while preventing molding and discoloration of the lumber by moisture resulting from vaporization of moisture which would become trapped between the film and the lumber, which comprises utilizing heat shrinkable film as the moisture-impervious plastic sheet material, preventing molding and discoloration by providing a layer of moisture absorbent material at least over the top of the lumber directly in contact therewith, forming an envelope of said heat shrinkable film over said lumber and which covers said moisture absorbent material, said moisture absorbent material preventing moisture from condensing into droplets to thus maintain the package dry and free of moisture, and applying heat to said film to shrink the same tightly over said layer and said lumber.

2. The method of claim 1 wherein said plastic film is biaxial shrink film, and said moisture absorbent layer is paper.

3. The method of claim 1 wherein said lumber is stacked and said moisture absorbent layer is applied at least partially over opposite sides and opposite ends as well as the top of the stack, and said plastic film is biaxial shrink film.

4. The method of claim 3 wherein said moisture absorbent layer is paper toweling, and said film has a thickness of at least about 4.0 mils.

5. The method of claim 4 wherein said film is blown polyethylene.

6. The method of claim 1 wherein heat shrunk folded gussets are provided in said plastic film at the top corners of the package.

7. A package comprising lumber; and a covering protecting the lumber against weathering comprising an envelope of moisture-impervious plastic film heat shrunk tightly over the lumber, and a layer of moisture absorbent material at least over the top of said lumber directly in contact therewith and between said film and said lumber for absorbing moisture to thereby prevent moisture from condensing into droplets to thus maintain the package dry and free of moisture and preclude molding and discoloration of the lumber.

8. The package of claim 7 wherein the plastic film is provided with heat shrunk folded gussets at the top corners of the package.

9. The package of claim 7 wherein said lumber is in a stack, the film covers the top, and at least partially the sides and ends of the stack, and the moisture absorbent layer is paper which covers the entire top, as well as at least partially the sides and ends of the stack.

10. The package of claim 9 wherein the ends of the stack are completely covered by the moisture absorbent paper.

11. The package of claim 7 wherein said moisture absorbent layer is paper toweling, and said film is biaxial shrunk film having a thickness of at least about 4.0 mils.

12. A package comprising pieces of stacked lumber; and a covering protecting the lumber against weathering comprising an envelope of moisture-impervious biaxially shrinkable plastic film heat shrunk tightly over the lumber with folded gussets heat shrunk tightly over the top corners of the package, and a layer of non-perforated moisture absorbent material at least over the top of said lumber between said film and said lumber for absorbing moisture and preventing moisture from condensing into droplets thereby maintaining the package dry and free of moisture to preclude molding and discoloration of the lumber.

* * * * *